Figure 1:
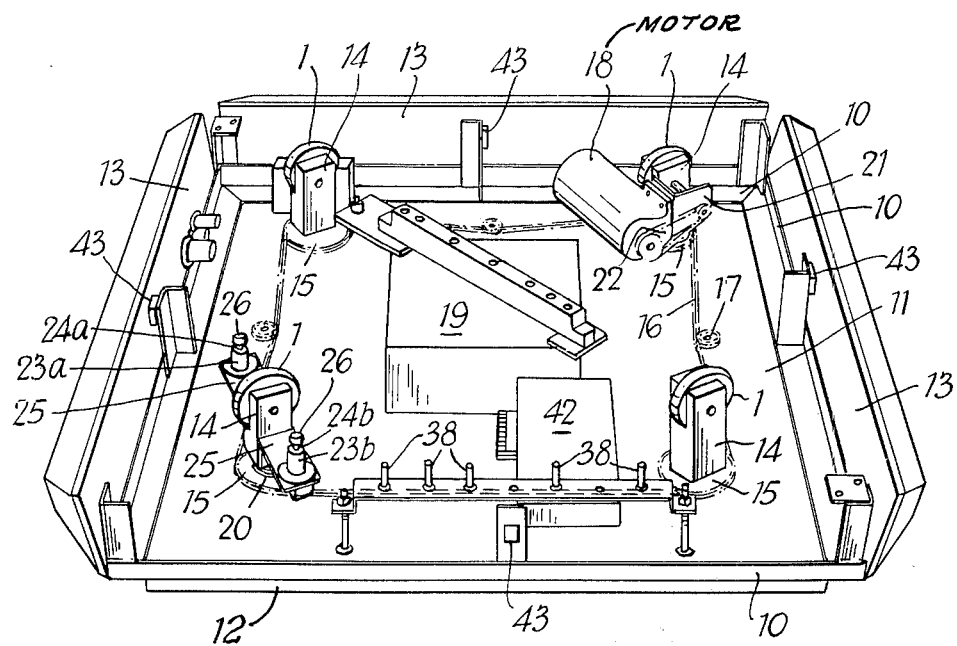

United States Patent [19]
Straffon et al.

[11] 3,935,559
[45] Jan. 27, 1976

[54] TRANSPORTER SYSTEMS

[75] Inventors: Alan E. Straffon, Carshalton; James C. King, Hemel Hempstead, both of England

[73] Assignees: Electronic Machine Control (Sales) Limited, Mitcham; Dexion-Comino International Limited, Wembley, both of England

[22] Filed: May 16, 1974

[21] Appl. No.: 470,484

[30] Foreign Application Priority Data
May 31, 1973 United Kingdom............... 25920/73

[52] U.S. Cl................... 340/32; 180/96; 343/7 ED
[51] Int. Cl.²........................................... G08G 1/00
[58] Field of Search............ 340/32, 33, 34; 180/98, 180/96; 343/5 PD, 12 R, 7 ED, 908

[56] References Cited
UNITED STATES PATENTS

| | | | |
|---|---|---|---|
| 2,974,304 | 3/1961 | Nordlund............................ | 340/104 |
| 3,095,564 | 6/1963 | Cartwright........................... | 343/13 |
| 3,235,025 | 2/1966 | Quinn................................ | 180/82.1 |
| 3,541,555 | 11/1970 | Willie et al........................ | 343/720 |
| 3,660,811 | 5/1972 | Vail et al.......................... | 340/33 |

*Primary Examiner*—Thomas B. Habecker
*Assistant Examiner*—James J. Groody
*Attorney, Agent, or Firm*—Pollock, Philpitt & Vande Sande

[57] ABSTRACT

According to the invention, a car, for a transporter system, is provided, as means for detecting the close proximity of another car, with a device operated alternately as a signal transmitter and as a receiver and a plurality of plates at sides of the car, at least one plate, for example that of the leading side, being connected to the said device to serve as a receiving plate when the device is operating as a receiver and at least one plate being so connected to serve as a transmitting plate when the said device is operating as transmitter. Advantageously, switch means automatically changes over the connections of the plates to the said device in dependence upon the direction of travel. The output of the device when operating as a receiver may interrupt the driving of the car upon the detection of another car within a predetermined proximity.

8 Claims, 3 Drawing Figures

TRANSPORTER SYSTEMS

This invention concerns improvements relating to transporter systems for the movement of goods. In such systems, whether palletized or unpalletized, difficulties arise in connection with the achievement of regular spacing between transporter cars or trolleys when they are in motion and/or when they accumulate in a stationary queue. Difficulties are also encountered in relation to the avoidance of collisions between cars where two or more paths meet. The invention seeks to obviate such difficulties by simple effective means.

SUMMARY OF THE INVENTION

According to the invention, this is to be achieved by means mounted on the cars and adapted for sensing from one car the presence of another car or cars either in front of it or to one side or the other and for causing the said one car to stop if it approaches within a predetermined distance of another, thus allowing the other car or cars to advance out of its path before it is itself set in motion again.

According to the invention, a car is provided with a transmitter-receiver device operated alternately as a transmitter or and as a receiver and a plurality of plates at different sides of the car, at least one plate being connected to the said device to serve as a receiving plate when the device is operating as a receiver and at least one plate to serve as a transmitting plate when the said device is operating as a transmitter. The transmission may be in the form of trains of pulses, with an equal mark/space ratio. In other words, the transmitter-receiver device is switched to transmit and receive oscillations of suitable frequency for equal periods. A suitable oscillation frequency is, for example 90 KHZ, while switching is at lower frequency, for example 300 Hertz.

Generally there will be four upright plates attached to the four sides of the car but electrically insulated therefrom. These plates are preferably so connected to the transmitter-receiver device that the plate at the leading side of the car when it is in motion is receiving when the said device is modulated to receive and the plates on the other three sides are transmitting when the device is modulated to transmit. However, the plate on the trailing side of the car may alternatively be the transmitting plate.

With such arrangement, when cars approach each other, a signal is passed from a transmitting plate of one to a receiving plate of the other substantially by capacitative coupling. The received signal may be utilised, for example, to cut off electric power-supply to a car motor, or in some other way to cause the car to stop, for instance with the assistance of braking. When the other car has moved away, so that the strength of the signal received by the stationary car has fallen below a predetermined level, the latter is set in motion again.

Figure 3:
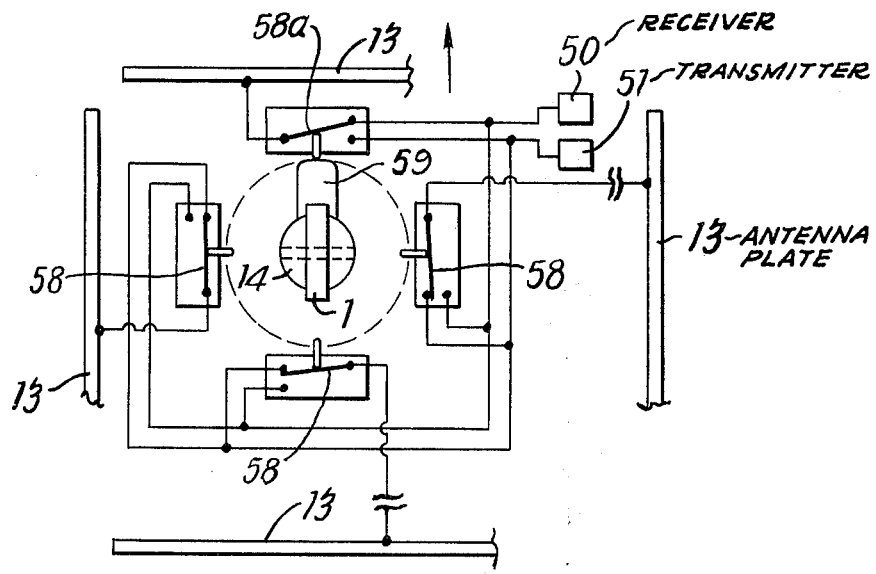
Figure 2:
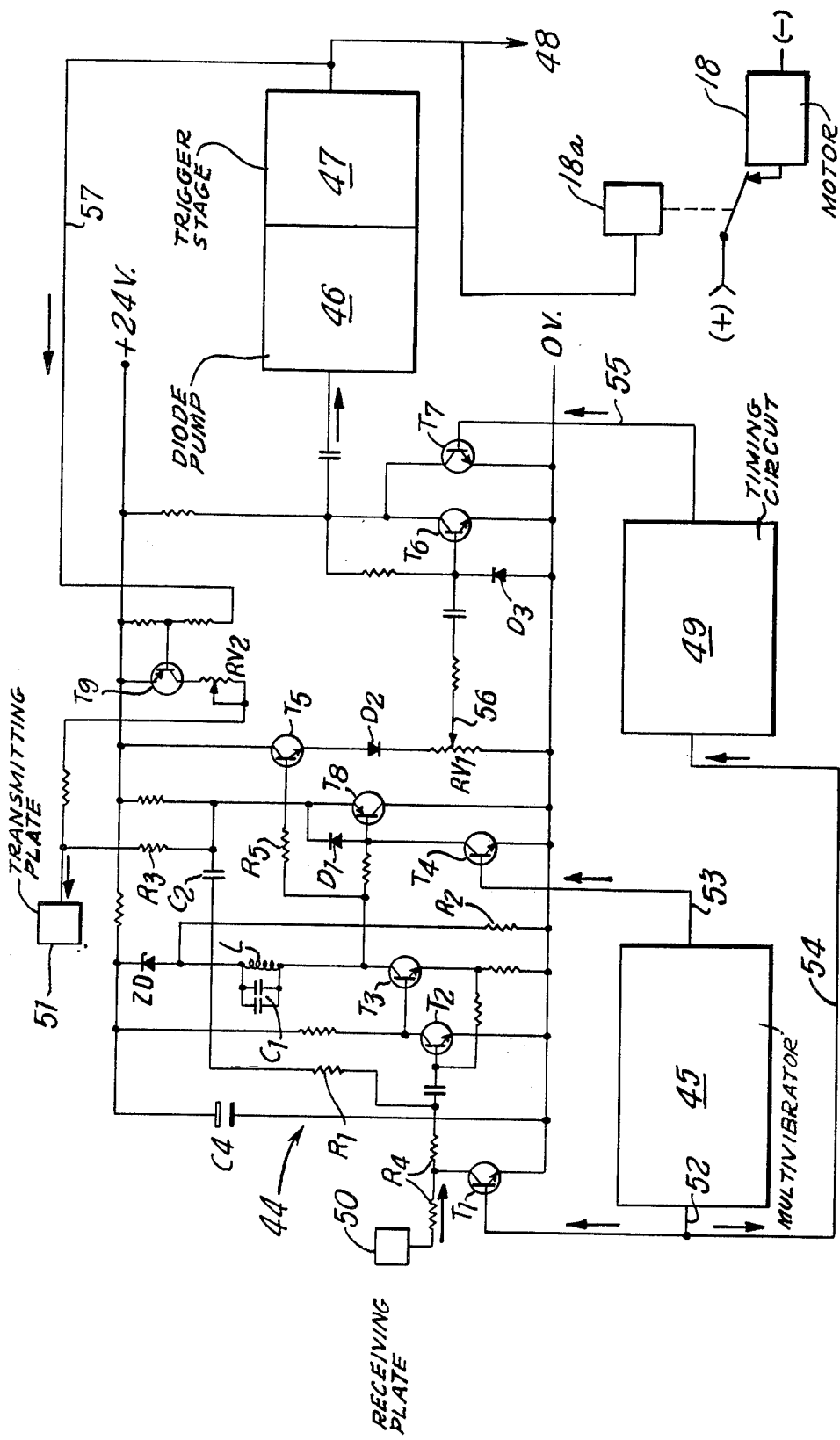

One manner of carrying the invention into effect, by way of example, will now be more fully described with reference to the accompanying drawings, in which:

FIG. 1 is an underneath perspective view of a transporter car, one skirt section having been removed, FIG. 2 a circuit diagram of a transmitter-receiver device and associated components, and FIG. 3 a diagrammatic illustration of an arrangement for switching connections between the said device and transmitting and receiving plates on the car.

This embodiment of the invention will be described with reference to a transporter system such as is described and illustrated in the Specification of U.S. application Ser. No. 333,102, now Pat. No. 3,845,718, to which the invention is advantageously applicable. FIG. 1 illustrates a form of car described and claimed in that Specification. The car runs on four unflanged wheels 1 on pairs of rails which consist of flat steel plates secured to the floor and having upstanding flanges outside which respective wheels 1 travel. At junctions, the plates adjoin steel platforms also having upstanding flanges, but affording freedom to the wheels to perform steering movements.

The car comprises a frame 10 supporting an under plate 11 and an upper, load-carrying, plate 12. Substantially vertical skirt sections 13 are hingedly connected at their upper edges to the four sides of the frame 10. Each wheel 1 is mounted in a pillar 14 which is itself mounted on the plate 11 so that it can swivel about a vertical axis. Fast with the mountings 14 are sprocket wheels 15 coupled, by a chain 16, so that the wheels 1 will always turn together about the vertical axes. Primary guidance need be applied at one wheel 1 only and only one wheel need be driven. As illustrated, guidance and drive are provided at two diagonally opposite wheels, but they may be applied at one and the same wheel.

The driven wheel 1 is driven by a direct-current electric motor 18 supplied by way of slip rings from secondary batteries carried in a case 19. The motor 18 is supported by a bracket 21 from the pillar 14 and the drive is transmitted to the wheel 1 through reduction gearing and chain and sprocket gear 22.

Steering at junctions in the track is by electromechanical means. For example, two vertical solenoids 23a, 23b energisable by way of slip rings at 20 and housing plungers 24a, 24b are carried at the ends of arms 25 extending one to each side from the pillar 14 for the primary-guidance wheel. Normally these arms 25 extend at right angles to the direction of travel, that is parallel to the leading edge of the car. The lower ends, furnished with rollers 26, of the plungers are engageable with small upstanding stops provided at corners of the above-mentioned junction platform. The location and nature of a stop will depend upon the function which it has to perform at the particular guidance point. A common case will be that of a junction at which a car may be required either to pass straight through or to be turned off at a right angle. The height of the stop is such that it will not be engaged by a plunger unless the latter has been brought to the lower of its two possible positions by the action of the solenoid. If it is in its upper position, it will simply pass over the stop and the car will continue in its original direction. If the plunger is in its lower position, however, it will be temporarily arrested by the stop, so that the arms 25 and wheel 1 will be turned, as the car progresses, through 90°. All of the wheels 1 will be so turned and guided onto the rails of a track at right angles to the previous direction of travel, the arms 25 being then at right angles to the new direction. Guidance of each car is initiated by static devices on the track, for instance by energisation of D.C. solenoids there. For co-operation with these solenoids, selectively positioned reed switches 38 are suspended below the car.

Control circuitry, which is also supplied from the batteries referred to above, is enclosed within a housing 42 which may also enclose switchgear for the motor 18.

To avoid risk of damage or injury due to accidental encounter of a car with an object or person, each skirt section 13 is associated with a microswitch 43 supported upon the frame 10. Upon encounter of a skirt section with an obstruction, closure of the switch is arranged to de-energise the motor 18 and arrest the car until the obstruction is removed. In the event of failure of the proximity-sensing means to be described, the switches 43 will also provide for emergency sensing of other cars.

The above-described car and track arrangements are not in themselves the subject of the present invention. Fuller description thereof is to be found in the aforesaid U.S. Patent.

For the purposes of the invention, however, the four upright skirt plates 13 are insulated from the frame 10 and utilised as signal-transmitting and receiving plates as hereinbefore described. To this end, they are connected to a low-powered transmitter-receiver device so operated as to transmit and receive alternately for equal periods. This device, in addition to the actual transmitter-receiver stage 44 shown in detail in FIG. 2 and designed to operate at 90 KHz, comprises an astable multivibrator switching circuit 45 operating at a lower frequency, suitably 300 Hertz, a two-stage diode-pump circuit 46 followed by a trigger stage 47, suitably of the Schmitt type with output 48, and a timing circuit 49 of resistance-capacity type. The transmitter-receiver circuit comprises NPN transistors T1 to T7, PNP transistors T8 and T9, Zener diode ZD, diodes D1, D2 and D3 which protect the box/emitter junctions of transistors T8, T5 and T6 respectively from breakdown should a condition of excessive reverse biassing occur, variable resistors RV1 and RV2 and several resistors and capacitors to which reference will be made insofar as they are significant for an understanding of the invention and do not serve obvious purely conventional, roles. The circuit is connected at 50 to the plate 13 which is to serve as receiving plate and at 51 to the plates 13 which are to serve as transmitting plates. The multivibrator 45, which may be of conventional transistor type, has two outputs, at 52 and 53, connected to the bases of the transmistors T1 and T4 respectively. A branch 54 from the output at 52 is connected to the input of the timing circuit 49, whose output via 55 is connected to the base of the transistor T7. A tuned circuit consisting of inductance L and capacitors C1 is associated with the transistors T2 and T3. Capacitor C2 and resistor R1 complete a feed-back circuit hereinafter referred to. The Zener diode ZD in conjunction with resistor R2 provides a stablised voltage to the collector of the transistor T3 through the inductance L.

In operation, the multivibrator 45 furnishes signals alternately at the outputs 52, 53 with a frequency of 300 KHz, whereby the transmitter-receiver circuit is switched at that frequency between transmitting and receiving conditions. For the former condition the transistor T4 is turned off by the multivibrator signal via 53, so that the transistor T8 is operative. Any received signals are blocked due to the transistor T1 being turned on. The feed-back circuit C2, R1 is operative and the circuit oscillates at 90 KHz, its output at the emitter of the transistor T8 being fed by way of resistor R3 and terminal 51 to the transmitting plates 13. In the receiving condition, in which the circuit serves as a tuned amplifier, the transistor T4 is on and T8 is inoperative. The transistor T1 is off and T2 is operative. The circuit no longer serves as oscillator, but is capable of receiving 90 KHz signals from the receiving plates 13 via terminal 50 and resistors R4. The signals are amplified and fed via transistor T5 to the resistor RV1 acting as a sensitivity-control potentiometer.

The multivibrator output whilst the circuit is in the transmitting condition passes via 54 through the timing circuit 49 and via 55 to the base of the transistor T7. The transistor T7 is switched on and blocks the diode-pump circuit 46. The timing circuit 49 is designed in known manner so that its output via 55 to the transistor T7 will instantly cut off the signal from the transmitting-receiving circuit 44 to the diode-pump circuit 46 when the multivibrator switches the former circuit to transmit. When the circuit 44 is switched to receive, however, the timing circuit will delay the signal to the diode-pump circuit sufficiently to allow self-oscillations to die, thereby preventing the last few cycles of the transmitting condition from furnishing a false signal to the circuit 46. In other words, a fast attack, slow release, characteristic is provided by the circuit 49.

If during operation, one car with the equipment described above comes in close proximity to another car similarly equipped, then, by capacitative coupling, the transmission from the transmitting plates of the said other car will be received by the receiving plate 13 of the said one car. A voltage signal with a frequency of 90 KHz within a 300 Hz envelope will apear, while the circuit 44 is in the receiving condition, at the slider 56 of the resistor RV1. This signal, smoothed in the circuit 46, is passed to the trigger circuit 47. If the amplitude of the smoothed signal is above a predetermined value, corresponding to a predetermined proximity of the other car, say about 1 meter, the trigger circuit will be operated and will supply a "stop" signal at the output 48. As hereinafter explained, this signal can be utilised in various ways to stop the said one car.

By virtue of a back connection 57, the transistor T9 will be turned on when the stop signal is present and will impose a loading on the signal transmitted while the circuit 44 is in the transmitting condition. The transmitted signal will thereby be attenuated to an extent preset by the variable resistor RV2. Consequently the car-to-car distance at which the said tranmitted signal would produce an effective stop signal in the equipment of the other car will be decreased. This assists in preventing a possible stalemate situation between two cars approaching each other.

The stop signal at 48 may be utilised, possibly after further amplification and/or rectification, simply to actuate relay 18a or contactor means for cutting off the supply of power to the motor 18 or to cause the car to stop in some other manner, for instance with the assistance also of dynamic or rheostatic braking. For instance, a motor contactor may first be de-energised, causing a low resistance to be connected across the motor armature. After a brief delay, a field contactor is also de-energised. The car can then be brought to rest quickly to rheostatic braking. However, the signal at 48 may be supplied to a logic circuit which also takes account of other control instructions to be given automatically to each car, for instance "turn" instructions and other stop instructions such as signals from switches 43.

When the other car has moved away, so that the strength of the signal supplied to the trigger circuit 47 on the said one car falls below a predetermined level, the signal at 48 will cease and after a predetermined delay, obtained by a resistor-capacitor circuit, the motor 18 will be restarted and the car set in motion again. This delay will ensure adequate spacing between the moving cars. Such delay may also be made effective after removal of an obstruction following stoppings by the action of a switch 43.

If the leading car in a line of moving cars on a straight track is stopped, following cars will stop behind it with approximately equal distances between them. When the leading car moves again, the others will move in turn. If desired, time-delay provision may be made in the circuit of each car to ensure the maintenance of a longer such distance when the cars are moving than when they are stationary.

At a junction, a car will similarly receive a signal, causing it to stop, if another car is approaching the junction from a different direction or is stationary there. Particularly for this kind of encounter, it is advantageous that the transmitting power of the car which first detects a signal of predetermined strength from the other car is automatically attenuated, as described above, (by, say, about 50%), so as to preclude risk of both cars being stopped. If desired also the sensitivities of the transmitter-receiver circuits, or the relay-operating voltages, on different cars may be made slightly different. Finally, the switching frequencies of the several cars may differ slightly in order to avoid possible difficulties due to signal synchronisation.

If, as will generally be the case, the cars of a system turns corners in such a manner that a different side of a car becomes the leading side after a corner has been turned, the connections between the plates 13 and the transmitter-receiver circuit 44 should be switched so that the same relationship between the plates and the direction of motion is maintained. This switching can be effected by the means shown in FIG. 3. A series of two-position switches 58 associated with respective plates 13 are arranged to be actuated by a cam 59 fixed on the pillar 14 of one car wheel 1. An actuated switch, the switch 58a as shown, connects its plate 13 to the receiver terminal at 50. The unactuated switches connect their plates 13 to the transmitting terminal at 51. If a car makes a turn through 90°, the wheel 1 and cam 59 will also turn through 90°. The switch 58a will move to its other position and the cam 59 will actuate another switch 58. In this manner, it can be ensured that, say, it is always the leading plate 13 that is connected to the receiver terminal at 50.

If provision is made for reversal of direction of car travel, switching means may take similar account of such reversal.

We claim:

1. Tracked transporter apparatus comprising,
a plurality of cars each having a plurality of wheels mounted to swivel about an upright axis,
a power unit drivingly connected to at least one of said wheels,
steering means operable for imparting swivelling movement to said wheels to cause the car selectively to follow a predetermined track course,
means for detecting the proximity, in any direction, of another car, said detecting means comprising an electronic transmitter and receiver means operated alternately as a transmitter and as a receiver,
a plurality of antenna plates, one at each side of the car,
and switching means being controlled by said steering means of the car for selectively connecting one of said plates to said receiver means to serve as a receiving plate, concurrent control means for connecting said receiver means to said antenna plate to serve as a receiver and said other plates being connected by said switching means to said transmitter means to serve as transmitting plates, and means controlling said transmitter and receiver means to operate alternately.

2. The apparatus according to claim 1, wherein said plate at the leading side of the car with respect to the direction of travel is connected to serve as receiving plate.

3. The apparatus according to claim 1, wherein switch means responsive to change in direction of travel of the car changes over the connections of said plates of the transmitter and receiver means, whereby said plate at the leading side of the car with respect to the direction of travel is connected to serve as a receiving plate and the others as transmitting plates.

4. The apparatus according to claim 1, wherein the transmitter and receiver means is controlled so as to operate alternately as transmitter and as receiver by a multivibrator means.

5. Apparatus according to claim 4 which further includes timing delay means whose input is connected to said multivibrator means actuated by said delay circuit for gating the output signal from the receiver means.

6. Apparatus according to claim 1, wherein said transmitter and receiver means has means for attenuating its transmitted signal, said attenuating means being actuated when said apparatus is receiving a signal whose strength exceeds a predetermined value.

7. Apparatus according to claim 1 and provided with a self-contained source of power including an electric car-driving motor which is supplied by a battery disposed on the car.

8. The apparatus according to claim 1 which further includes means for controlling said power unit, trigger means responsive to the output of said receiver means for actuating said power unit control means to de-energize said power unit when the output of said receiver means reaches a predetermined level corresponding to the presence of another car within a predetermined proximity.

* * * * *